US011341124B2

(12) United States Patent
Chen et al.

(10) Patent No.: US 11,341,124 B2
(45) Date of Patent: May 24, 2022

(54) MISSING DATA COMPENSATION METHOD, MISSING DATA COMPENSATION SYSTEM, AND NON-TRANSITORY COMPUTER-READABLE MEDIUM

(71) Applicant: INSTITUTE FOR INFORMATION INDUSTRY, Taipei (TW)

(72) Inventors: Xaver Chen, Taipei (TW); Chien-Kai Huang, Taipei (TW); Hsin-Tse Lu, Taipei (TW); Chih-Hsuan Liang, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 292 days.

(21) Appl. No.: 16/675,236

(22) Filed: Nov. 6, 2019

(65) Prior Publication Data

US 2021/0097060 A1    Apr. 1, 2021

(30) Foreign Application Priority Data

Oct. 1, 2019    (TW) .................... 108135586

(51) Int. Cl.
| | |
|---|---|
| *G06F 7/00* | (2006.01) |
| *G06F 16/23* | (2019.01) |
| *G06K 9/62* | (2022.01) |
| *G06N 5/04* | (2006.01) |
| *G06N 20/00* | (2019.01) |

(52) U.S. Cl.
CPC ...... *G06F 16/2379* (2019.01); *G06F 16/2365* (2019.01); *G06K 9/6215* (2013.01); *G06K 9/6256* (2013.01); *G06K 9/6298* (2013.01); *G06N 5/04* (2013.01); *G06N 20/00* (2019.01)

(58) Field of Classification Search
CPC . G06F 16/2379; G06F 16/2365; G06N 20/00; G06N 5/04; G06K 9/6215; G06K 9/6256; G06K 9/6298

USPC .......................... 707/600–899, 755
See application file for complete search history.

(56) References Cited

U.S. PATENT DOCUMENTS

2021/0117449 A1 * 4/2021 Cheim ................ G05B 13/042

FOREIGN PATENT DOCUMENTS

TW         201126361 A    8/2011

OTHER PUBLICATIONS

The office action of the corresponding Taiwanese application dated Jul. 13, 2020.

* cited by examiner

*Primary Examiner* — Isaac M Woo
(74) *Attorney, Agent, or Firm* — CKC & Partners Co., LLC

(57) ABSTRACT

A missing data compensation method, missing data compensation system and non-transitory computer-readable medium are provided in this disclosure. The method includes the following operations: inputting a sensing signal by a sensor; searching for a historical data sections similar to a first data section from the plurality of historical data sections to generate a plurality of candidate data sections; calculating a plurality of data relation diagrams according to the first data section and the candidate data sections, respectively; utilizing a feature recognition model to calculate a plurality of similarity values according to the data relation diagrams; selecting a candidate data section corresponding to the maximum similarity value as a sample data section; and utilizing the data in the sample data section to compensate the data in the first data section to generate compensated data section.

13 Claims, 8 Drawing Sheets

MISSING DATA COMPENSATION METHOD, MISSING DATA COMPENSATION SYSTEM, AND NON-TRANSITORY COMPUTER-READABLE MEDIUM

CROSS-REFERENCE TO RELATED APPLICATION

This application claims priority to Taiwanese Application Serial Number 108135586, filed on Oct. 1, 2019, which is herein incorporated by reference.

BACKGROUND

Field of Invention

The present application relates to a missing data compensation method, system and non-transitory computer-readable medium. More particularly, the present application relates to a missing data compensation method for device information, missing data compensation system for equipment information and non-transitory computer-readable medium.

Description of Related Art

The important equipment of the factory production line generally sets up sensors to detect the voltage, current, temperature, vibration amplitude and other data of the equipment, as the equipment operating status evaluation. However, when the sensors collect the signals of equipment, the sensor may have a missing value due to external factors such as power supply abnormality, electromagnetic interference, and sensor overheating. Data with a missing value may lead to misjudgment when determining the status of the equipment, further causing a decreasing of the yield rate of the production line or a forced stop of the production line. Therefore, a missing data compensation method for compensating the missing value to decrease the misjudgment probability is required.

SUMMARY

An aspect of the disclosure is to provide a missing data compensation method. The missing data compensation method includes operations of: inputting a sensing signal by a sensor, wherein the sensing signal comprises a plurality of data sections, and a historical database comprises a plurality of historical data sections; searching for a historical data sections similar to a first data section from the plurality of historical data sections to generate a plurality of candidate data sections, wherein the first data section is one of the plurality of data sections; calculating a plurality of data relation diagrams according to the first data section and the plurality of candidate data sections, respectively; utilizing a feature recognition model to calculate a plurality of similarity values according to the plurality of data relation diagrams, respectively and selecting a candidate data section corresponding to maximum similarity value as a sample data section; and utilizing data in the sample data section to compensate data in the first data section to generate compensated data section.

Another aspect of the disclosure is to provide a missing data compensation system. The missing data compensation system includes a storage device and a processor. The processor is electrically connected to the storage device. The storage device is configured to storing a sensing signal and a historical database, wherein the sensing signal comprises a plurality of data sections, and the historical database comprises a plurality of historical data sections. The processor includes a sample searching unit, a relation diagram generating unit and a missing value compensation unit. The sample searching unit is configured for searching for a historical data sections similar to a first data section from the plurality of historical data sections to generate a plurality of candidate data sections, wherein the first data section is one of the plurality of data sections. The relation diagram generating is electrically connected to the sample searching unit, and configured for calculating a plurality of data relation diagrams according to the first data section and the plurality of candidate data sections, respectively. The missing value compensation unit is electrically connected to the relation diagram generating unit, and configured for utilizing a feature recognition model to calculate a plurality of similarity values according to the plurality of data relation diagrams, respectively and selecting a candidate data section corresponding to maximum similarity value as a sample data section; and utilizing data in the sample data section to compensate data in the first data section to generate compensated data section.

Another aspect of the disclosure is to provide a non-transitory computer-readable medium including one or more sequences of instructions to be executed by a processor for performing an attack path detection method, wherein the method includes operations of: establishing a connecting relationship among a plurality of hosts according to a host log set to generate a host association graph, wherein the host log set comprises a log corresponding to each of the plurality of hosts; labeling at least one host with an abnormal condition on the host association graph; calculating a risk value corresponding to each of the plurality of hosts; in a host without the abnormal condition, determining whether the risk value corresponding to the host without the abnormal condition is greater than a first threshold, and utilizing a host with the risk value greater than the first threshold as a high-risk host; and searching at least one host attach path from the high-risk host and the at least one host with the abnormal condition according to the connecting relationship of the host association graph.

Based on aforesaid embodiments, the missing data compensation method, missing data compensation system and non-transitory computer-readable medium primarily improve the problem of misjudgment of signals with missing value. This disclosure is capable of searching for similar candidate signals from the historical database; utilizing the cross recurrence plot to analyze candidate signals most similar to signals with missing values to generate the sampling signals and utilizing the sampling signals to compensate signals with missing values. In some embodiments, this disclosure is able to decrease the misjudgment probability.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, unless otherwise defined, all terms (including technical and scientific terms) have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

Figure 1A:
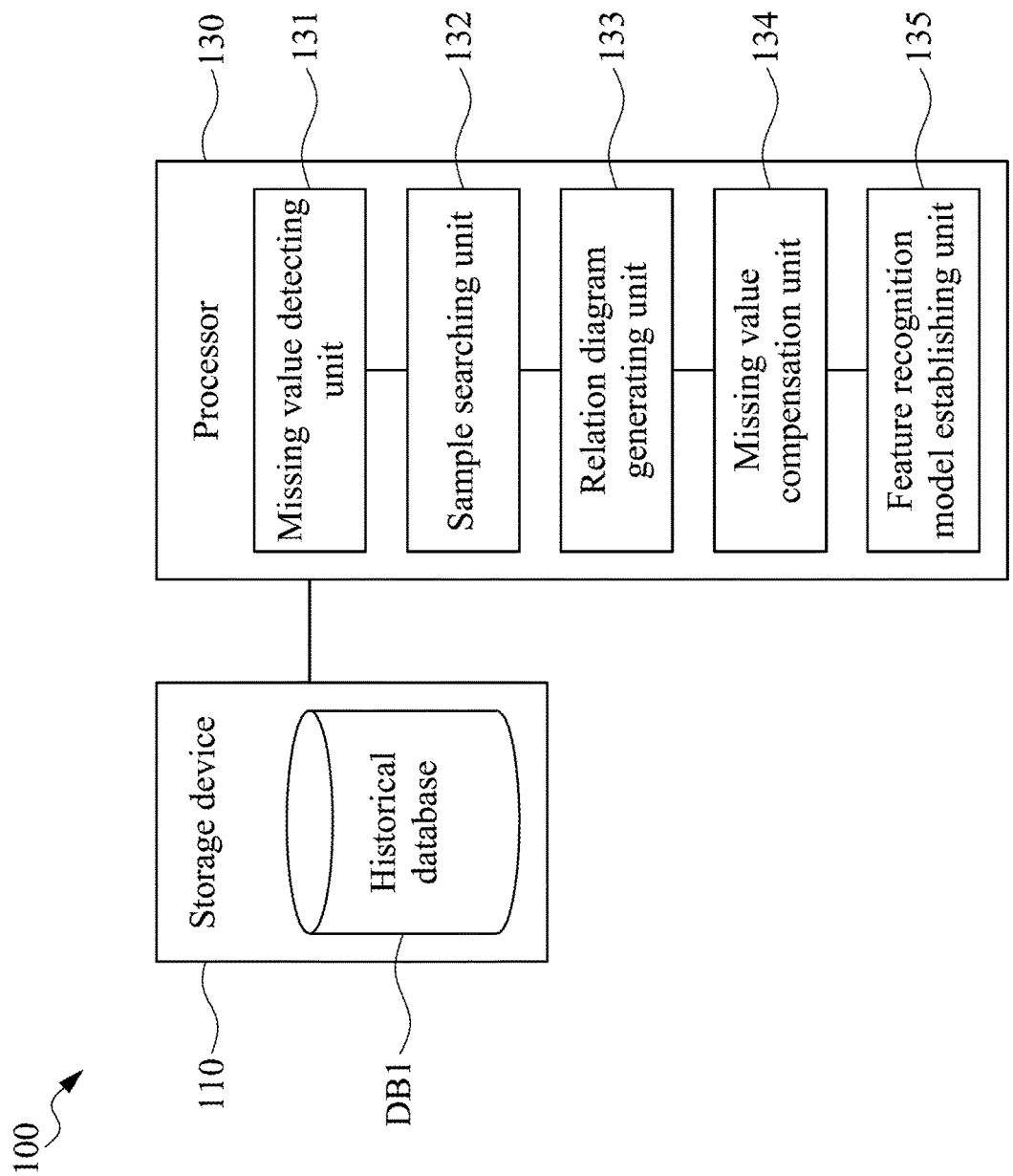
FIG. 1A is a functional block diagram illustrating a missing data compensation system according to an embodiment of the disclosure.

Reference is made to FIG. 1A, which is a functional block diagram illustrating a missing data compensation system 100 according to an embodiment of the disclosure. As shown in FIG. 1A, the attack path detection system 100 includes a storage device 110 and a processor 130. The processor 130 is electrically connected to the storage device 110. The storage device 110 is configured to store sensing signals, a historical database DB1, and a feature recognition model. In the embodiment, the sensing signals and the historical monitoring signals stored in the historical database DB1 are the information about the operating state of the device sensed by the sensor installed on the device. For example, the sensing signals can be sensing signals generated by temperature sensors, pressure sensors, vibration sensors, current sensors, etc.

Afterwards, as shown in FIG. 1A, the processor 130 includes a missing value detecting unit 131, a sample searching unit 132, a relation diagram generating unit 133, a missing value compensation unit 134 and a feature recognition model establishing unit 135. The sample searching unit 132 is electrically connected to the missing value detecting unit 131 and the relation diagram generating unit 133. The missing value compensation unit 134 is electrically connected to the relation diagram generating unit 133 and the feature recognition model establishing unit 135. The processor 130 is configured to detect a time point of the missing value in the sensing signals, and utilize the historical signal similar with the sensing signal to compensate the missing data value in the sensing signal.

Figure 1B:
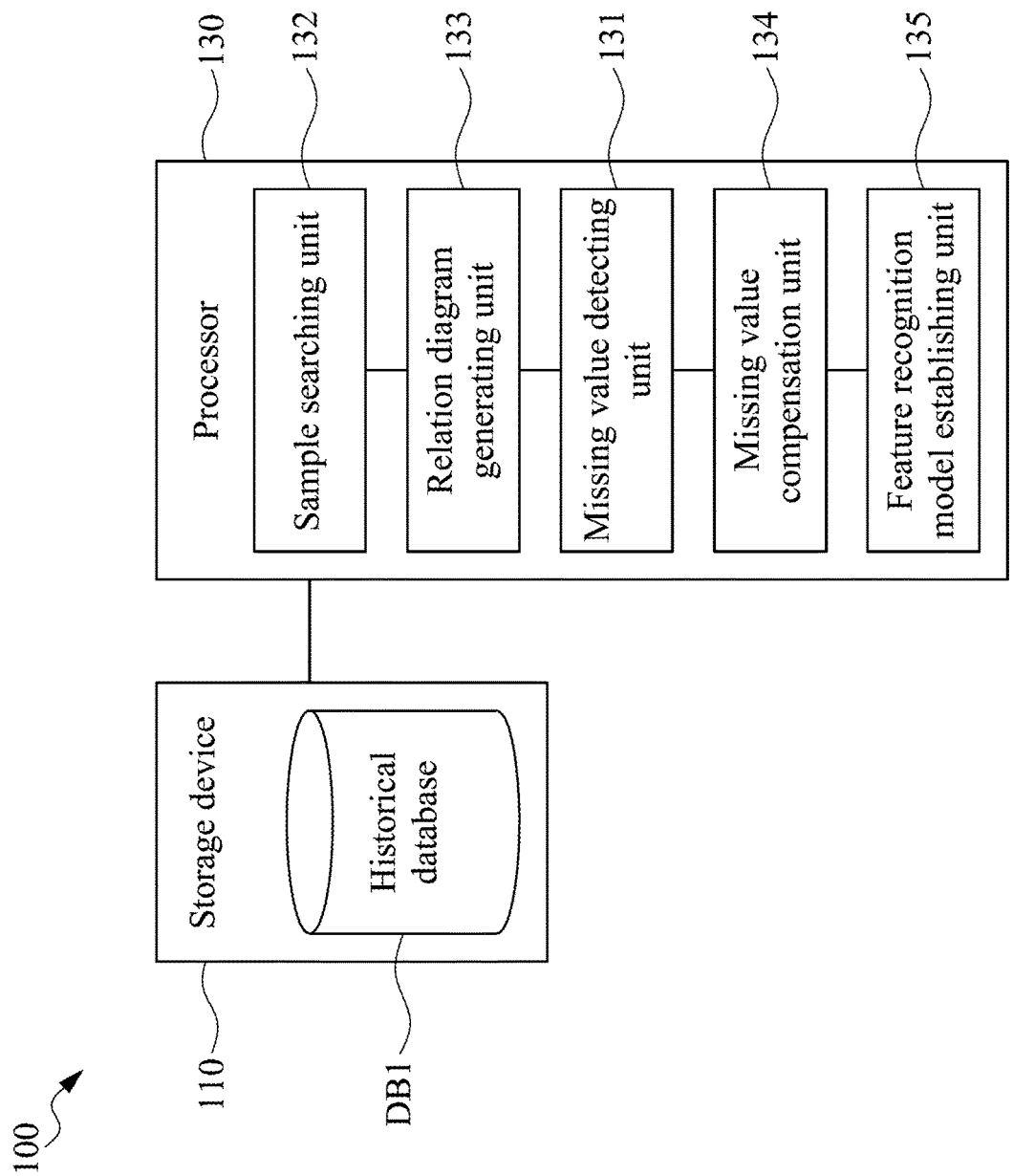
FIG. 1B is a functional block diagram illustrating a missing data compensation system according to an embodiment of the disclosure.

In another embodiment, reference is made to FIG. 1B, which is a functional block diagram illustrating a missing data compensation system 100 according to an embodiment of the disclosure. The difference between the embodiment shown in FIG. 1B and the embodiment shown in FIG. 1A is the connection of the missing value detecting unit 131. As shown in FIG. 1B, the missing value detecting unit 131 is electrically connected to the relation diagram generating unit 133 and the missing value compensation unit 134.

In the embodiments of the disclosure, the processor 130 can be implemented by a microcontroller, a microprocessor, a digital signal processor, an application specific integrated circuit, a central processing unit, a control circuit and/or a graphics processing unit. The storage device 110 can be implemented by a memory, a hard disk, a flash drive, a memory card, etc.

Figure 2:
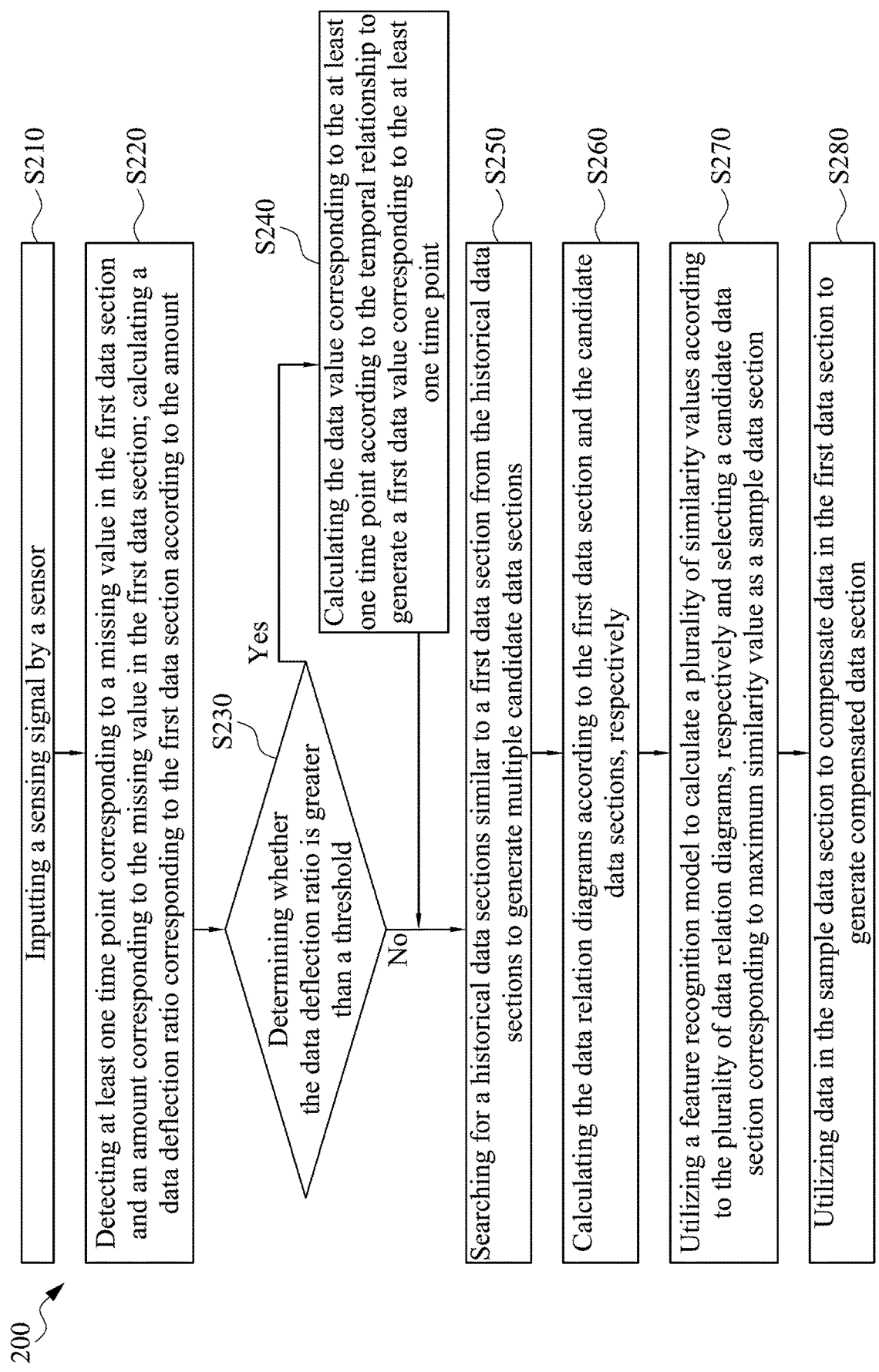
FIG. 2 is a flow diagram illustrating a missing data compensation method according to an embodiment of this disclosure.

Reference is made to FIG. 2, which is a flow diagram illustrating a missing data compensation method 200 according to an embodiment of this disclosure. In the embodiment, the missing data compensation method 200 can be applied to the missing data compensation system 100 of FIG. 1A and FIG. 1B. The processor 130 is configured to detect a time point of the missing value in the sensing signals, and utilize the historical signal similar with the sensing signal to compensate the missing data value in the sensing signal according to the steps described in the following missing data compensation method 200.

The missing data compensation method 200 firstly executes step S210 inputting a sensing signal by a sensor. The sensing signal includes multiple data sections, and the historical database DB1 includes multiple historical data sections. In the embodiment, each device includes multiple sensors of different types, and the sensors can be implemented by a temperature sensor, a pressure sensor, a vibration sensor, a current sensor, etc. In this case, using the pressure sensor as an example, it is assumed that the pressure sensor can detect 1024 data per minute, and one data section can be the sensing signal with duration of 1 minute. It means that one data section includes 1024 data. In another embodiment, it is assumed that one data section can be the sensing signal with duration of 3 minutes, and it means that one data section includes 3072 data. However, the disclosure is not limited thereto. It is noticed that sensing signals and the monitoring signals are the data signals with the temporal relationship.

Afterwards, the missing data compensation method 200 executes step S220 detecting at least one time point corresponding to a missing value in the first data section and an amount corresponding to the missing value in the first data section; calculating a data deflection ratio corresponding to the first data section according to the amount. The first data section is one of the multiple data sections. In the embodiment, firstly, the processor 130 is configured to detect the amount of the missing values in the first data section. For example, it is assumed that the amount of the missing values is 200, and the amount of data in the first data section is 1024. Thus, the data deflection ratio corresponding to the first data section is 19.5% (i.e., (200/1024)*100%=19.5%).

Afterwards, the missing data compensation method 200 executes step S230 determining whether the data deflection ratio is greater than a threshold. If the data deflection ratio is greater than the threshold, further executing step S240, calculating the data value corresponding to the at least one time point according to the temporal relationship to generate a first data value corresponding to the at least one time point. Based on aforesaid embodiment, it is assumed that the threshold is 10%, and the data deflection ratio corresponding to the first data section is greater than the threshold, so the time points of the missing data should be compensated. For example, the first data section S1 is illustrated in the table TB1. It is notices that the table TB1 merely shown the data values of time point T1~T5, however, the disclosure is not limited thereto.

TABLE TB1

|    | T1    | T2 | T3    | T4  | T5   |
|----|-------|----|-------|-----|------|
| S1 | 8.229 | X  | 9.034 | 8.7 | 9.12 |

Afterwards, the first data section S1 has a missing value at the time point T2, and the data deflection ratio is greater than the threshold. Thus, the interpolation method is used to compensate the data value of the time point T2, and the calculated data value of the time point T2 is 8.6315. It is means that the first data value of the time point T2 is 8.6315. It is noticed that, if the data defection ratio is greater than the threshold value, the data deflection may affect the subsequent operations. Therefore, the missing data value is compensated by interpolation method to obtain the temporary first data value.

Afterwards, the missing data compensation method 200 executes step S250, searching for a historical data sections similar to a first data section from the historical data sections to generate multiple candidate data sections. It is noticed that, if the data deflection ratio is less than or equal to the threshold, the margin of the data defection is within tolerance. Therefore, the operation of step S250 is directly executed. In the embodiment, if the sensing signal is the differential pressure signal of the equipment A, the historical differential pressure signal of the equipment A is searched in the historical database DB1 to compensate the missing value of the first data section. For example, multiple historical data sections SC1~SC5 are illustrated in the table TB2. It is notices that the table TB2 merely shown the data values of time point T1~T5, however, the disclosure is not limited thereto.

TABLE TB2

|     | T1   | T2    | T3    | T4    | T5    |
|-----|------|-------|-------|-------|-------|
| SC1 | 8.15 | 8.75  | 8.914 | 9.012 | 9.086 |
| SC2 | 7.89 | 8.42  | 8.96  | 8.65  | 8.83  |
| SC3 | 5.33 | 6.12  | 6.57  | 4.32  | 5.66  |
| SC4 | 6.54 | 5.89  | 6.53  | 7.15  | 7.59  |
| SC5 | 8.23 | 8.781 | 9.112 | 8.956 | 9.22  |

Afterwards, the greedy algorithm is used to find one or more candidate data sections similar to the first data section. It is noticed that other search algorithms also can be used to find candidate data sections similar to the first data section. However, the disclosure is not limited thereto. After performing step S250, the historical data sections SC1, SC2, and SC5 are similar with the first data section as illustrated in the table TB2, and thus the historical data sections SC1, SC2, and SC5 are selected as the candidate data sections.

Afterwards, the missing data compensation method 200 executes step S260, calculating the data relation diagrams according to the first data section and the candidate data sections, respectively. In the embodiment, the degree of similarity between the first data section S1 and the candidate data sections SC1, SC2 and SC5 are calculated by using a Cross Recurrence Plot (CRP). The cross recurrence plot can be used to analyze the degree of similarity between different systems. When the two systems are more similar, the more obvious diagonal pattern will appear on the cross recurrence diagram. Therefore, the degree of similarity between two systems can be determined by the length of the diagonal segment.

Figure 3B:
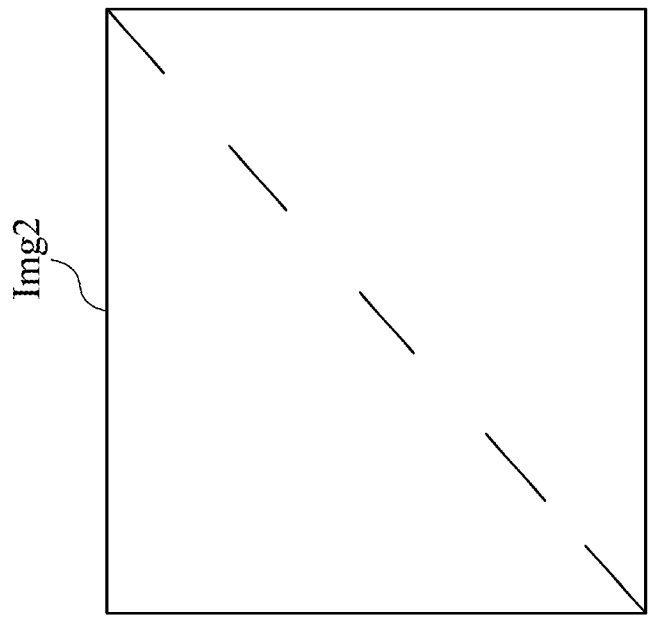
FIG. 3B is a schematic diagram illustrating the data relation diagram graph Img2 according to an embodiment of this disclosure.
Figure 3A:
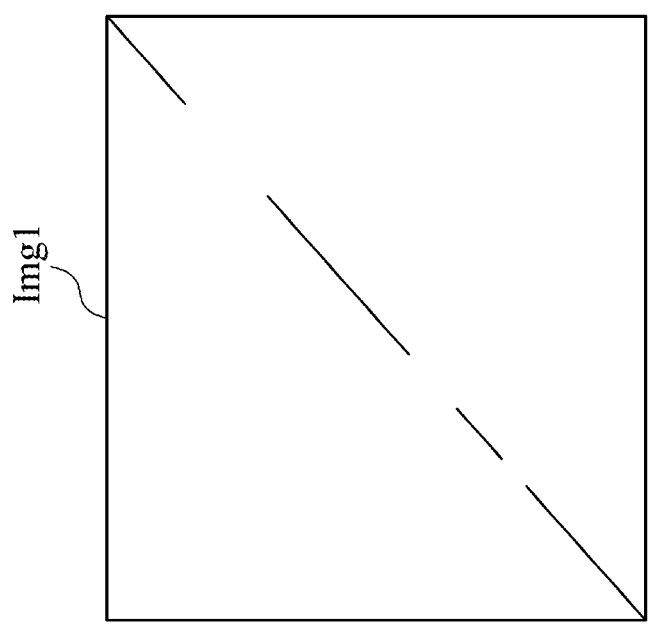
FIG. 3A is a schematic diagram illustrating the data relation diagram graph Img1 according to an embodiment of this disclosure.
Figure 3C:
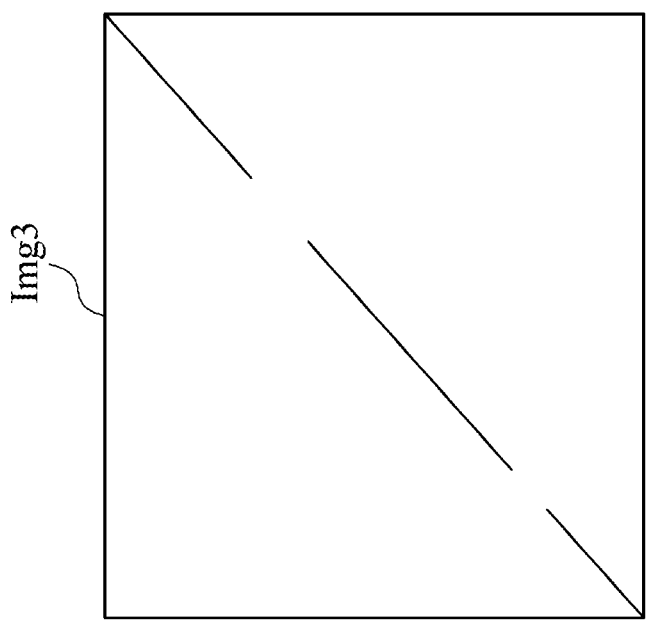
FIG. 3C is a schematic diagram illustrating the data relation diagram graph Img3 according to an embodiment of this disclosure.

Afterwards, reference is made to FIG. 3A to FIG. 3C. FIG. 3A is a schematic diagram illustrating the data relation diagram graph Img1 according to an embodiment of this disclosure. FIG. 3B is a schematic diagram illustrating the data relation diagram graph Img2 according to an embodiment of this disclosure. FIG. 3C is a schematic diagram illustrating the data relation diagram graph Img3 according to an embodiment of this disclosure. In the embodiment, the data relation diagram graph Img1 is a cross recurrence diagram generated by the relationship between the first data section S1 and the candidate data section SC1. The data relation diagram graph Img2 is a cross recurrence diagram generated by the relationship between the first data section S1 and the candidate data section SC2. The data relation diagram graph Img3 is a cross recurrence diagram generated by the relationship between the first data section S1 and the candidate data section SC3.

Afterwards, the missing data compensation method 200 executes step S270, utilizing a feature recognition model to calculate a plurality of similarity values according to the plurality of data relation diagrams, respectively and selecting a candidate data section corresponding to maximum similarity value as a sample data section. Before executing step S270, it is necessary to establish the feature recognition model. In the embodiment, the training images and feature values corresponding to each training image are used as the training data and it is utilized the convolutional neural network (CNN) to train aforesaid training data. The training images include the images containing multiple diagonal patterns, and the feature values is calculated by converting the diagonal patterns in the training image into a numerical representation. In other words, if the length of the diagonal patterns in the training image is longer, the feature values are higher. It is noticed that the feature recognition model generated by using the training images and the feature values as the training data can be used to calculate the similarity value corresponding to the data relation diagram generated in step S270.

Based on aforesaid embodiment, as shown in FIG. 3A to FIG. 3C, the data relation diagrams Img1, Img2, and Img3 are merely shown the image content of the diagonal pattern (filtered out other image content). The diagonal pattern in the data relation diagram Img1 is longer than the diagonal pattern in the data relation diagram Img2. Therefore, the candidate data section SC1 is more related to the first data section S1 than the candidate data section SC2. The similarity value of the candidate data section SC1 is higher than the similarity value of the candidate data section SC2.

Afterwards, the diagonal pattern in the data relation diagram Img3 is longer than the diagonal pattern in the data relation diagram Img1. In other words, the diagonal pattern of the data relation diagram Img3 has fewer line segments. Therefore, the candidate data section SC5 is more related to the first data section S1 than the candidate data section SC1. The similarity value of the candidate data section SC5 is higher than the similarity value of the candidate data section SC1. Thus, the candidate data section SC5 is selected as the sample data section.

Figure 4:
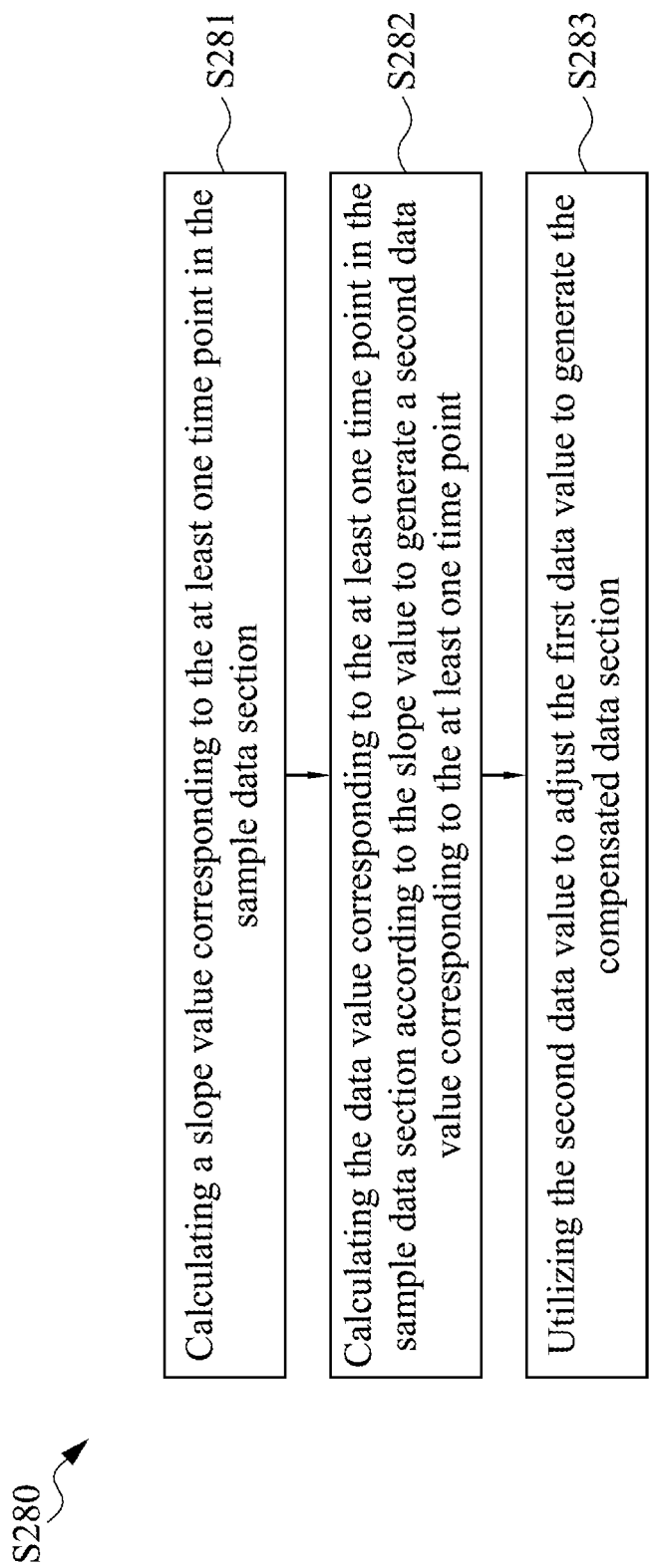
FIG. 4 is a flow diagram illustrating step S280 according to an embodiment of this disclosure.

Afterwards, the missing data compensation method 200 executes step S280, utilizing data in the sample data section to compensate data in the first data section to generate compensated data section. Reference is made to FIG. 4, which is a flow diagram illustrating step S280 according to an embodiment of this disclosure. The missing data compensation method 200 further executes step S281, calculating a slope value corresponding to the at least one time point in the sample data section. Based on aforesaid embodiment, the first data section S1 has the missing value at the time point T2. When the sample data section is selected, the data value of the sample data section at the time point T2 can be used to compensate for the missing data value of the time point T2 in the first data section S1. Therefore, the slope value corresponding to the time point T2 in the sample data section is 0.551.

Afterwards, the missing data compensation method 200 further executes step S282, calculating the data value corresponding to the at least one time point in the sample data section according to the slope value to generate a second data value corresponding to the at least one time point, and the step S283, utilizing the second data value to adjust the first data value to generate the compensated data section. Based on aforesaid embodiment, according to the slope value corresponding to the time point T2 in the sample data section, the data value of the time point T2 in the first data section S1 can be calculated as 8.78. The compensated data section S1 is illustrated in the table TB3. Because the sample data section is the most similar data section to the first data section, compared with the calculation using the interpolation method, the missing value in the first data section S1 can be calculated closer to the original data value by using the sample data section.

TABLE TB3

|    | T1    | T2   | T3    | T4  | T5   |
|----|-------|------|-------|-----|------|
| S1 | 8.229 | 8.78 | 9.034 | 8.7 | 9.12 |

Figure 5:
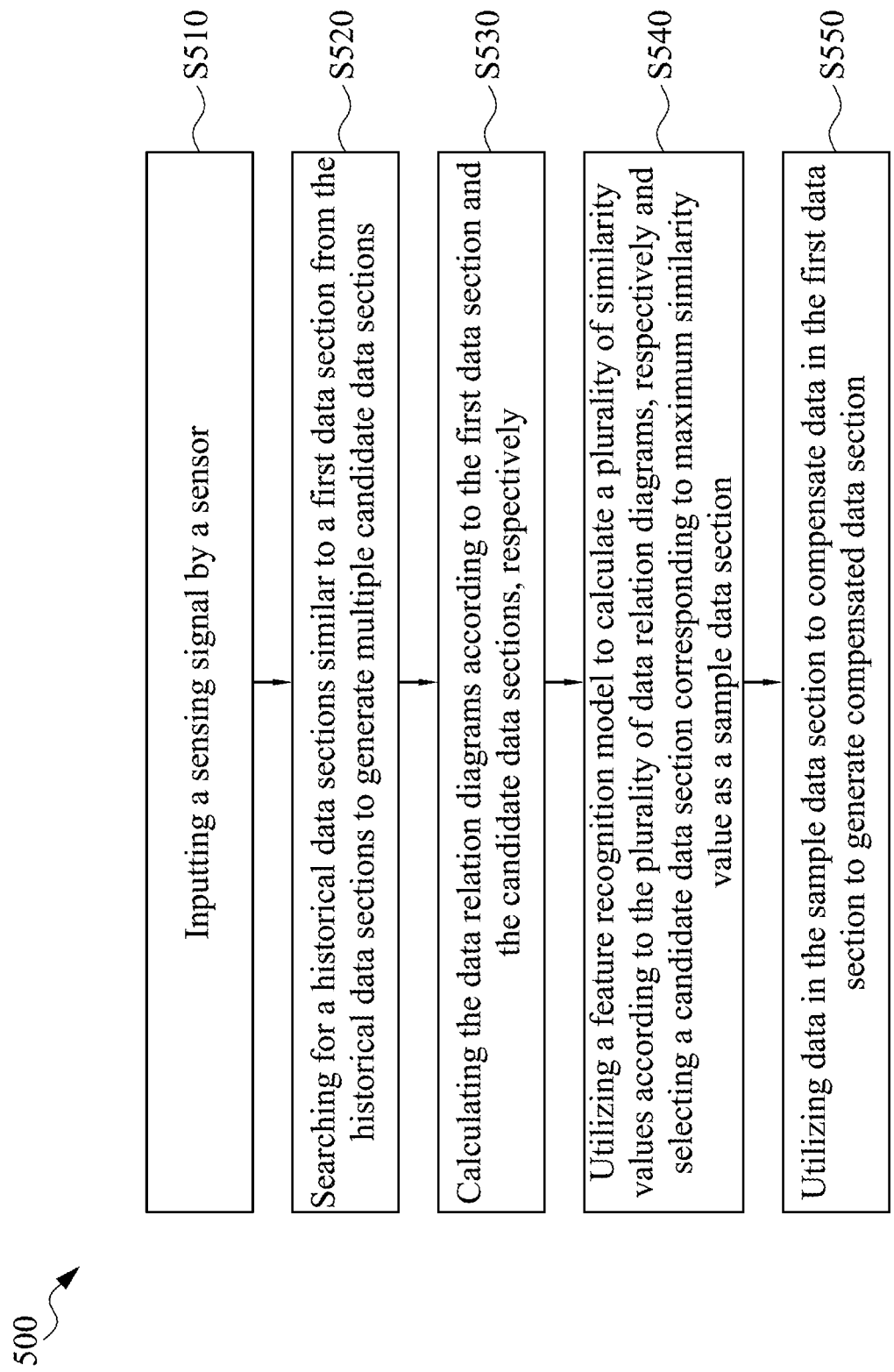
FIG. 5 is a flow diagram illustrating a missing data compensation method 500 according to an embodiment of this disclosure.

In another embodiment, reference is made to FIG. 5, which is a flow diagram illustrating a missing data compensation method 500 according to an embodiment of this disclosure. The missing data compensation method 500 firstly executes step S510 inputting a sensing signal by a sensor. In the embodiment, the operation of this step is similar with the operation of the step S210. For the sake of brevity, those descriptions will not be repeated herein. Afterwards, the missing data compensation method 500 executes step S520, searching for a historical data sections similar to a first data section from the historical data sections to generate multiple candidate data sections. In this case, the operation of the step S520 is similar with the operation of the step S250. For the sake of brevity, those descriptions will not be repeated herein.

Afterwards, the difference between the embodiment of the missing value compensation method 500 and the embodiment of the missing value compensation method 200 is that the embodiment of the missing value compensation method 500 lacks the operations of steps S220 to S240. In the embodiment, the data deflection ratio will not be calculated, and the candidate data section is directly searched from the historical database DB1 according to the data section having the defected data.

Afterwards, the missing data compensation method 500 executes step S530, calculating the data relation diagrams according to the first data section and the candidate data sections, respectively. In the embodiment, the operation of the step S530 is similar with the operation of the step S260. For the sake of brevity, those descriptions will not be repeated herein.

Afterwards, the missing data compensation method 500 executes step S540, utilizing a feature recognition model to calculate a plurality of similarity values according to the plurality of data relation diagrams, respectively and selecting a candidate data section corresponding to maximum similarity value as a sample data section. In the embodiment, the operation of the step S540 is similar with the operation of the step S270. For the sake of brevity, those descriptions will not be repeated herein.

Figure 6:
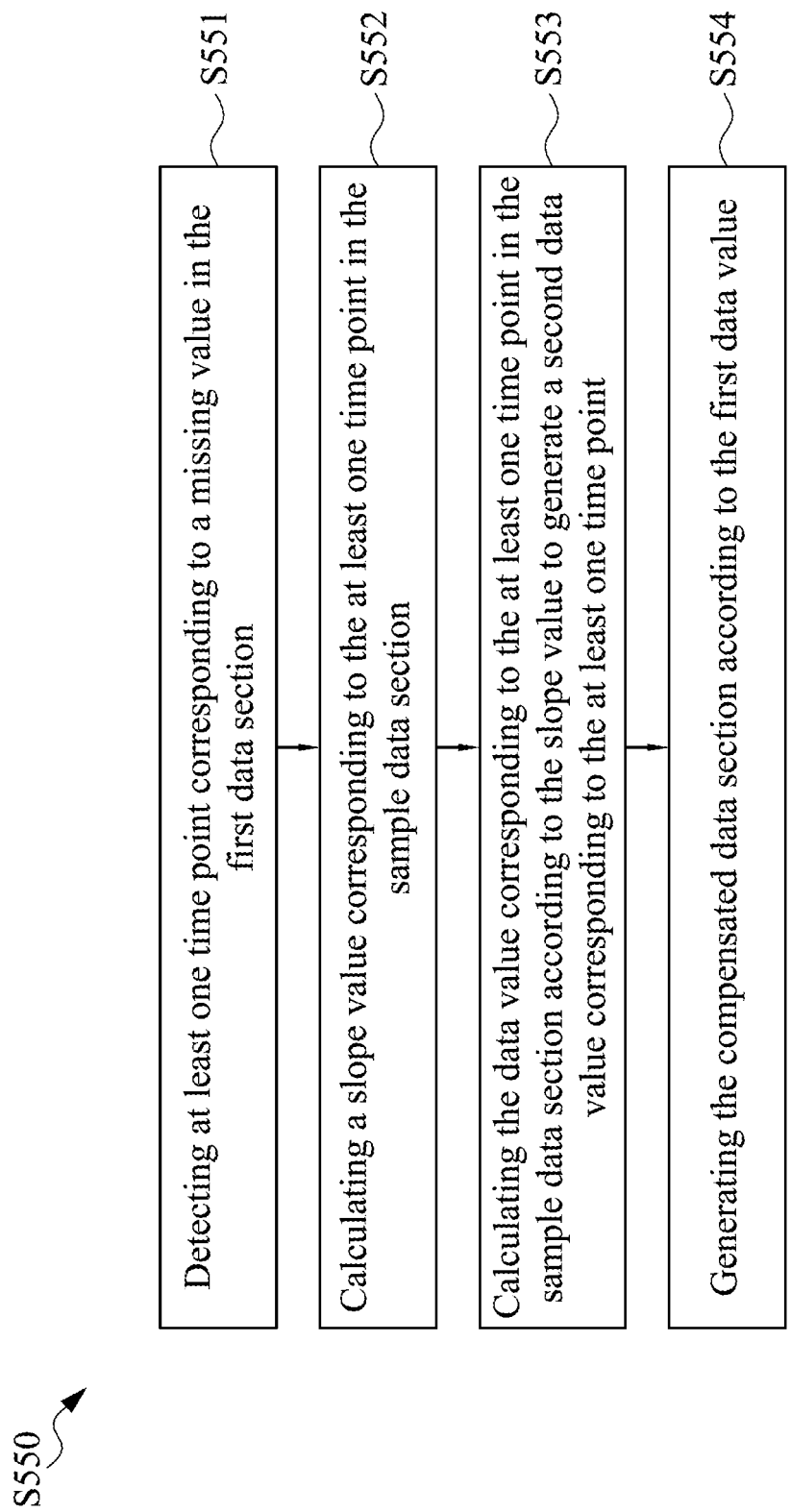
FIG. 6 is a flow diagram illustrating step S550 according to an embodiment of this disclosure.

Afterwards, the missing data compensation method 500 executes step S550, utilizing data in the sample data section to compensate data in the first data section to generate compensated data section. Reference is made to FIG. 6, which is a flow diagram illustrating step S550 according to an embodiment of this disclosure. The missing data compensation method 500 further executes step S551, detecting at least one time point corresponding to a missing value in the first data section. In the embodiment, after searching the sample data section from the historical database DB1, it is need to detect the time point of the missing data value in the first data section, and compensate the missing data value.

The missing data compensation method 500 further executes step S552, calculating a slope value corresponding to the at least one time point in the sample data section. In the embodiment, the operation of the step S552 is similar with the operation of the step S281. For the sake of brevity, those descriptions will not be repeated herein.

The missing data compensation method 500 further executes step S553, calculating the data value corresponding to the at least one time point in the sample data section according to the slope value to generate a second data value corresponding to the at least one time point. In the embodiment, the operation of the step S553 is similar with the operation of the step S282. For the sake of brevity, those descriptions will not be repeated herein. When the time point of the missing data value in the first data section is detected, the slope value corresponding to the time point in the sample data section can be calculated, and the calculated slope value can be used to compensate the missing data value.

Afterwards, the missing data compensation method 500 further executes step S554, generating the compensated data section according to the first data value. After the above operations, the compensated data section can be generated. It is noticed that, the compensated data section is used to the input data for subsequent data analysis. In other words, in the related technology of analyzing whether the monitoring signal of the equipment is abnormal, the accuracy of the input data will have a huge impact on the subsequent judgment. Therefore, if the missing data can be restituted as much as possible, it can improve the accuracy of determining whether the device is abnormal.

Based on aforesaid embodiments, the missing data compensation method, missing data compensation system and non-transitory computer-readable medium primarily improve the problem of misjudgment of signals with missing value. This disclosure is capable of searching for similar candidate signals from the historical database; utilizing the cross recurrence plot to analyze candidate signals most similar to signals with missing values to generate the sampling signals and utilizing the sampling signals to compensate signals with missing values. In some embodiments, this disclosure is able to decrease the misjudgment probability.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A missing data compensation method, comprising:
inputting a sensing signal by a sensor, wherein the sensing signal comprises a plurality of data sections, and a historical database comprises a plurality of historical data sections;
searching for a historical data sections similar to a first data section from the plurality of historical data sections to generate a plurality of candidate data sections, wherein the first data section is one of the plurality of data sections;
calculating a plurality of data relation diagrams according to the first data section and the plurality of candidate data sections, respectively, wherein the plurality of data relation diagrams is a plurality of cross recurrence plots;
utilizing a feature recognition model to calculate a plurality of similarity values according to lengths of a plurality of diagonal segments corresponding to the plurality of data relation diagrams, respectively and selecting a candidate data section corresponding to maximum similarity value as a sample data section; and
utilizing data in the sample data section to compensate data in the first data section to generate compensated data section.

2. The missing data compensation method of claim 1, further comprising:
inputting a plurality of training images and a feature value corresponding to each of the training images; and
utilizing the plurality of training images and the feature value corresponding to each of the training images as training data to generate the feature recognition model.

3. The missing data compensation method of claim 1, wherein each of the data sections and a data value of each of the historical data sections have a temporal relationship.

4. The missing data compensation method of claim 3, further comprising:
detecting at least one time point corresponding to a missing value in the first data section and an amount corresponding to the missing value in the first data section;
calculating a data deflection ratio corresponding to the first data section according to the amount, determining whether the data deflection ratio is greater than a threshold;
if the data deflection ratio is greater than the threshold, calculating the data value corresponding to the at least one time point according to the temporal relationship to generate a first data value corresponding to the at least one time point.

5. The missing data compensation method of claim 4, wherein utilizing data in the sample data section to compensate data in the first data section to generate compensated data section, further comprising:
calculating a slope value corresponding to the at least one time point in the sample data section;
calculating the data value corresponding to the at least one time point in the sample data section according to the slope value to generate a second data value corresponding to the at least one time point; and
utilizing the second data value to adjust the first data value to generate the compensated data section.

6. The attack path detection method of claim 1, wherein utilizing data in the sample data section to compensate data in the first data section to generate compensated data section, further comprising:
detecting at least one time point corresponding to a missing value in the first data section;
calculating a slope value of the data value corresponding to the at least one time point in the sample data section;
calculating the data value corresponding to the at least one time point in the sample data section according to the slope value to generate a first data value corresponding to the at least one time point; and
generating the compensated data section according to the first data value.

7. A missing data compensation system, comprising:
a storage device, configured for storing a sensing signal and a historical database, wherein the sensing signal comprises a plurality of data sections, and the historical database comprises a plurality of historical data sections; and a processor, electrically connected to the storage device, the processor comprises:
- a sample searching unit, is configured for searching for a historical data sections similar to a first data section from the plurality of historical data sections to generate a plurality of candidate data sections, wherein the first data section is one of the plurality of data sections;
- an relation diagram generating unit is electrically connected to the sample searching unit, and configured for calculating a plurality of data relation diagrams according to the first data section and the plurality of candidate data sections, respectively, wherein the plurality of data relation diagrams is a plurality of cross recurrence plots; and
- a missing value compensation unit is electrically connected to the relation diagram generating unit, and configured for utilizing a feature recognition model to calculate a plurality of similarity values according to lengths of a plurality of diagonal segments corresponding to the plurality of data relation diagrams, respectively and selecting a candidate data section corresponding to maximum similarity value as a sample data section; and utilizing data in the sample data section to compensate data in the first data section to generate compensated data section.

8. The missing data compensation system of claim 7, further comprising:
- a feature recognition model establishing unit is electrically connected to the missing value compensation unit, and configured for inputting a plurality of training images and a feature value corresponding to each of the training images; and utilizing the plurality of training images and the feature value corresponding to each of the training images as training data to generate the feature recognition model.

9. The missing data compensation system of claim 7, wherein each of the data sections and a data value of each of the historical data sections have a temporal relationship.

10. The missing data compensation system of claim 9, further comprising:
- a missing value detecting unit is electrically connected to the sample searching unit, and configured for detecting at least one time point corresponding to a missing value in the first data section and an amount corresponding to the missing value in the first data section; calculating a data deflection ratio corresponding to the first data section according to the amount, determining whether the data deflection ratio is greater than a threshold; if the data deflection ratio is greater than the threshold, calculating the data value corresponding to the at least one time point according to the temporal relationship to generate a first data value corresponding to the at least one time point.

11. The missing data compensation system of claim 10, wherein the missing value compensation unit is further configured for calculating a slope value corresponding to the at least one time point in the sample data section; calculating the data value corresponding to the at least one time point in the sample data section according to the slope value to generate a second data value corresponding to the at least one time point; and utilizing the second data value to adjust the first data value to generate the compensated data section.

12. The missing data compensation system of claim 7, wherein the missing value compensation unit is further configured for detecting at least one time point corresponding to a missing value in the first data section; calculating a slope value of the data value corresponding to the at least one time point in the sample data section; calculating the data value corresponding to the at least one time point in the sample data section according to the slope value to generate a first data value corresponding to the at least one time point; and generating the compensated data section according to the first data value.

13. A non-transitory computer-readable medium including one or more sequences of instructions to be executed by a processor for performing a missing data compensation method, wherein the method comprises:
- inputting a sensing signal by a sensor, wherein the sensing signal comprises a plurality of data sections, and a historical database comprises a plurality of historical data sections;
- searching for a historical data sections similar to a first data section from the plurality of historical data sections to generate a plurality of candidate data sections, wherein the first data section is one of the plurality of data sections;
- calculating a plurality of data relation diagrams according to the first data section and the plurality of candidate data sections, respectively, wherein the plurality of data relation diagrams is a plurality of cross recurrence plots;
- utilizing a feature recognition model to calculate a plurality of similarity values according to lengths of a plurality of diagonal segments corresponding to the plurality of data relation diagrams, respectively and selecting a candidate data section corresponding to maximum similarity value as a sample data section; and
- utilizing data in the sample data section to compensate data in the first data section to generate compensated data section.

* * * * *